(12) United States Patent
Starnes, Jr.

(10) Patent No.: US 6,622,653 B1
(45) Date of Patent: Sep. 23, 2003

(54) ANIMAL FEED SUPPORT STAND

(76) Inventor: Harlan Starnes, Jr., 2341 6$^{th}$ St. SE., Hickory, NC (US) 28602

( * ) Notice: Subject to any disclaimer, the term of this patent is extended or adjusted under 35 U.S.C. 154(b) by 0 days.

(21) Appl. No.: 10/266,318

(22) Filed: Oct. 8, 2002

(51) Int. Cl.$^7$ ................................................. A01K 5/00
(52) U.S. Cl. ................................ 119/51.01; 119/51.11; 119/57.91
(58) Field of Search ........................... 119/51.01, 57.91, 119/52.1, 53, 57.8, 61, 51.11; 248/125.2, 188.1, 188.5, 188.8

(56) References Cited

U.S. PATENT DOCUMENTS

| | | | | |
|---|---|---|---|---|
| 1,145,049 A | * | 7/1915 | Williams | 119/61 |
| 1,239,404 A | * | 9/1917 | Knoll, Jr. | 239/70 |
| 1,359,691 A | * | 11/1920 | Genuit | 119/70 |
| 2,583,203 A | * | 1/1952 | Bergeron | 119/52.1 |
| 3,195,508 A | * | 7/1965 | Lehman et al. | 119/51.11 |
| 3,623,620 A | * | 11/1971 | Vermette | 414/420 |
| 4,027,627 A | * | 6/1977 | Fillion | 119/51.11 |
| 4,658,759 A | * | 4/1987 | Brown | 119/61 |
| 4,986,220 A | * | 1/1991 | Reneau et al. | 119/57.91 |
| 5,107,775 A | * | 4/1992 | Langlais et al. | 108/147.21 |
| 5,143,289 A | * | 9/1992 | Gresham et al. | 239/7 |
| 5,233,941 A | * | 8/1993 | Ayliffe et al. | 119/57.91 |
| 5,421,290 A | * | 6/1995 | Welch | 119/51.11 |
| 5,584,263 A | * | 12/1996 | Sexton | 119/51.5 |
| 5,632,230 A | * | 5/1997 | Dornetta | 119/537 |
| D397,527 S | * | 8/1998 | Bruder et al. | D30/121 |
| 5,794,563 A | * | 8/1998 | Klepac | 119/57.91 |
| 6,082,300 A | * | 7/2000 | Futch | 119/51.11 |

OTHER PUBLICATIONS

Cabela's Catalog; Title of Article: N/A; Title of Item: Cabela's E–Z Load Game Feeder; Item No.: 22–5353; Publication Date: Prior to Oct. 8, 2002; P.: 260.

Cabela's Catalog; Title of Article: N/A; Title of Item: Various Cabela's Feeders (Lifetime Elite Feeder, EZ Load with Elite Feeder, Explorer Feeder, Hunter Feeder, KENCO Tornado Feeder, KENCO Straight Shooter Feeder, Scout Feeder, etc); Date: Publication date: prior to Oct. 8, 2002; Pp.: 104–105.

* cited by examiner

Primary Examiner—Peter M. Poon
Assistant Examiner—Joan M. Olszewski
(74) Attorney, Agent, or Firm—Schwartz Law Firm, P.C.

(57) ABSTRACT

An animal feed support stand includes a plurality of elongated support legs. A protective housing is mounted on the legs, and defines an open bottom adapted for receiving an above-ground feed container for storing and dispensing animal feed. A carriage carries the feed container. A hoist cable moves the carriage vertically between a lowered fill position, whereby the feed container is located beneath the protective housing for filling, and a raised feed-dispensing position, whereby the feed container is located within the protective housing for dispensing feed to a ground surface below.

20 Claims, 5 Drawing Sheets

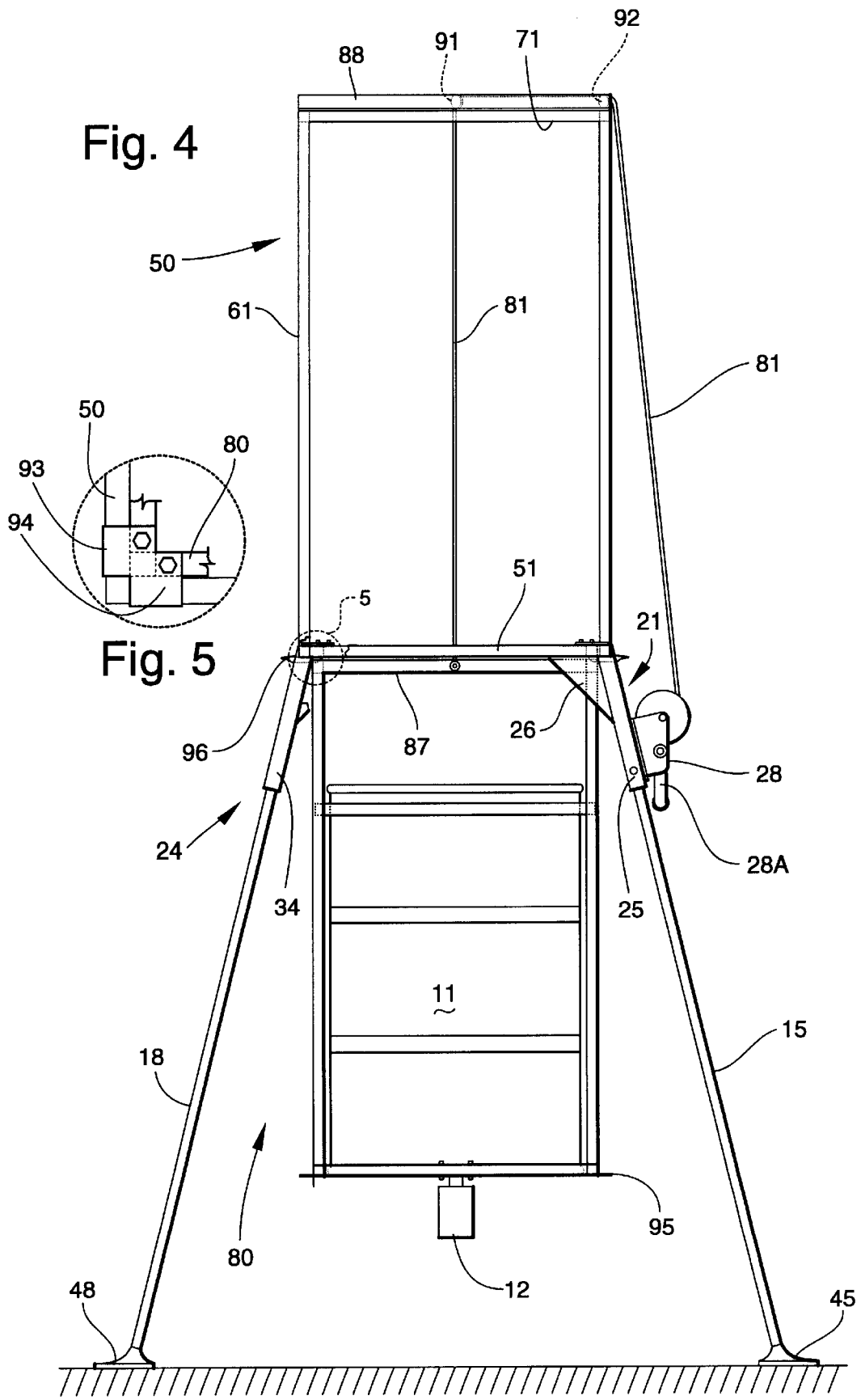

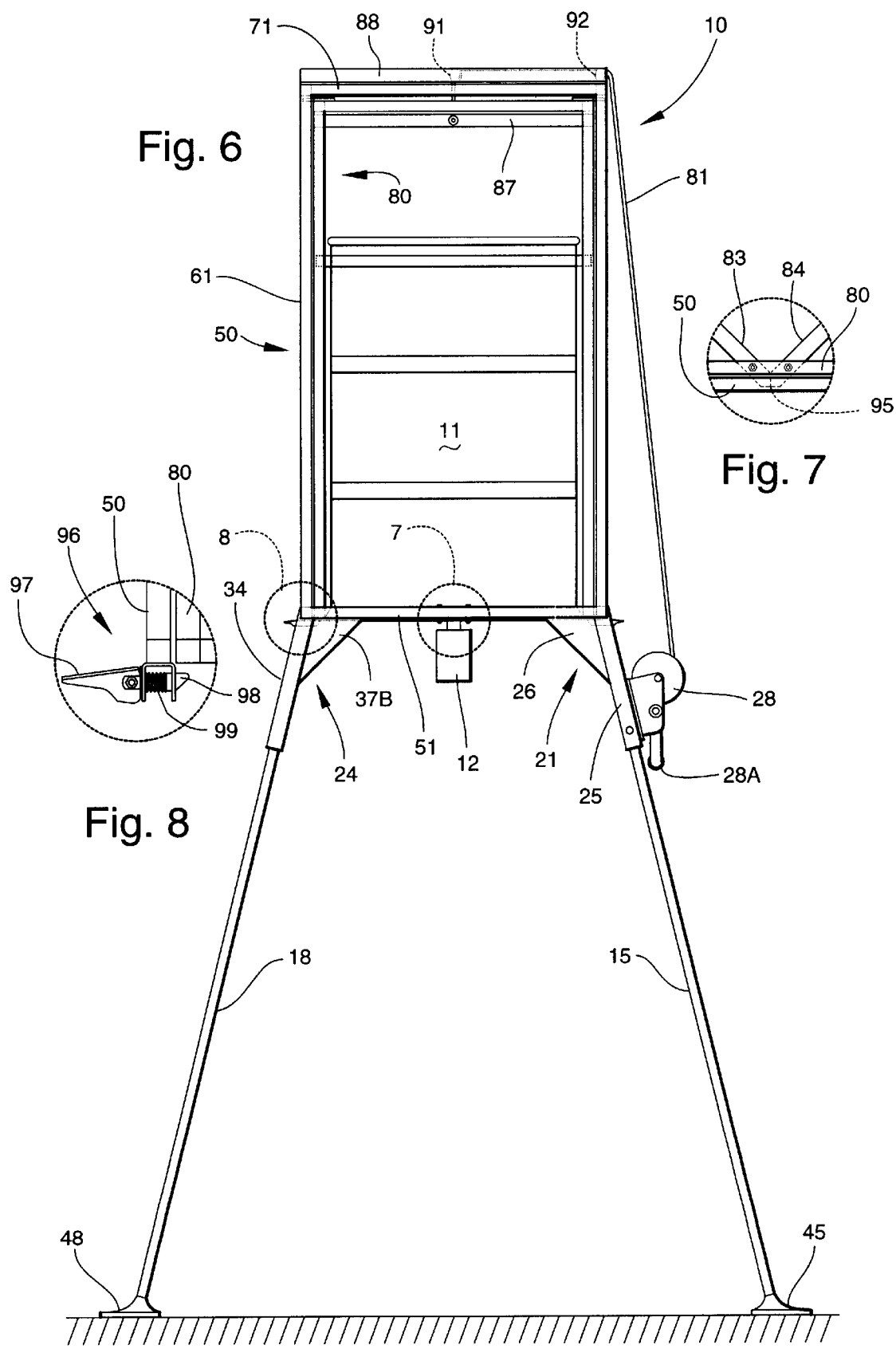

ANIMAL FEED SUPPORT STAND

TECHNICAL FIELD AND BACKGROUND OF INVENTION

This application relates to an animal feed support stand. The invention is especially applicable for supporting a feed container, such as a 30 to 55-gal barrel, with an automatic battery-powered feeder designed for dispensing animal feed, such as corn, grain, and pellets, multiple times during the day. The feeder is programmable to feed up to 6 or more times per day, and to throw feed up to 20 feet in any or all directions around the stand. The invention promotes viewing of deer, turkey, and other wildlife for landowners, photographers, and hunters.

Support stands for animal feed containers are well know and widely used in the game industry. Typical stands include a tripod base permanently mounted to a barrel feed container. The container is often located 8 to 12-ft above ground, and is generally difficult and inconvenient to fill and refill. Other stands utilize a hoist cable and heavy-duty winch to lift and lower the barrel container. While these stands are more convenient to fill, they lack safety features for controlling and limiting the movement of the container. The weight of the container when filled to capacity may range from 200 to 500-lbs. Should the container inadvertently fall to the ground, the risk of injury to nearby persons and damage to the feeder is substantial. Moreover, in either of the above stands, the feed container is entirely unprotected and exposed, and is often damaged by bears and other wildlife.

The present invention addresses several disadvantages and limitations of the prior art discussed above by providing an animal feed support stand with significant safety features and a protective frame formed around the feed container. The invention further offers means for readily and conveniently refilling the feed container with a reduced risk of injury and damage to the automatic feeder.

SUMMARY OF INVENTION

Therefore, it is an object of the invention to provide an animal feed support stand which protects the feed container against damage caused by bears and other wildlife.

It is another object of the invention to provide an animal feed support stand which has a number of safety features designed to control and limit movement of the feed container between a lowered fill position and a raised feed-dispensing position.

It is another object of the invention to provide an animal feed support stand which has a load capacity of as much as 750 -lbs.

It is another object of the invention to provide an animal feed support stand which can be conveniently and securely mounted on variable grade elevations.

It is another object of the invention to provide an animal feed support stand which is readily assembled and disassembled.

These and other objects of the present invention are achieved in the preferred embodiments disclosed below by providing an improved animal feed support stand. The stand includes a plurality of elongated support legs. A protective housing is mounted on the legs, and defines an open bottom adapted for receiving an above-ground feed container for storing and dispensing animal feed. A carriage carries the feed container. Means are provided for moving the carriage vertically between a lowered fill position, whereby the feed container is located beneath the protective housing for filling, and a raised feed-dispensing position, whereby the feed container is located within the protective housing for dispensing feed to a ground surface below.

According to another preferred embodiment of the invention, the means for moving includes a hoist cable connected to the carriage.

According to another preferred embodiment of the invention, the means for moving further includes a winch mounted adjacent to one of the plurality of support legs. The winch is connected to the hoist cable for mechanically retracting and extending the hoist cable to lift and lower the carriage.

According to another preferred embodiment of the invention, a cable pulley is located on top of the protective housing to direct and control the pulling force of the hoist cable.

According to another preferred embodiment of the invention, a second cable pulley is located on top of the protective housing to further direct and control the pulling force of the hoist cable.

According to another preferred embodiment of the invention, a carriage stop is located at a top of the carriage. The carriage stop is adapted for engaging a bottom of the protective housing to limit downward movement of the carriage in the fill position.

According to another preferred embodiment of the invention, a safety latch is located at a bottom of the protective housing. The safety latch is adapted for engaging the carriage to prevent sudden downward movement of the carriage from the raised feed-dispensing position.

According to another preferred embodiment of the invention, mounting feet are located at respective free ends of the support legs to stabilize the stand on the ground surface.

According to another preferred embodiment of the invention, each of the mounting feet defines an anchor opening adapted for receiving an anchor pin therethrough to further stabilize the stand on the ground surface.

According to another preferred embodiment of the invention, each of the support legs includes an elongated hollow female section and an elongated male section. The male section is adapted for being selectively received within the female section to adjust the length of the support leg.

According to another preferred embodiment of the invention, a threaded set pin extends through the female section of the support leg and is adapted for engaging the male section to set the length of the leg.

BRIEF DESCRIPTION OF THE DRAWINGS

Some of the objects of the invention have been set forth above. Other objects and advantages of the invention will appear as the description proceeds when taken in conjunction with the following drawings, in which:

FIG. 4 is a further side elevational view of the animal feed support stand, and showing the carriage and feed container in the lowered fill position;

FIG. 5 is an enlarged plan view of the elements shown in bubble 5 of FIG. 4;

FIG. 6 is a further side elevational view of the animal feed support stand with the carriage and feed container in the raised feed-dispensing position;

FIG. 7 is an enlarged plan view of the elements shown in bubble 7 of FIG. 6; and FIG. 8 is an enlarged plan view of the elements shown in bubble 8 of FIG. 6.

DESCRIPTION OF THE PREFERRED EMBODIMENT AND BEST MODE

Figure 1:
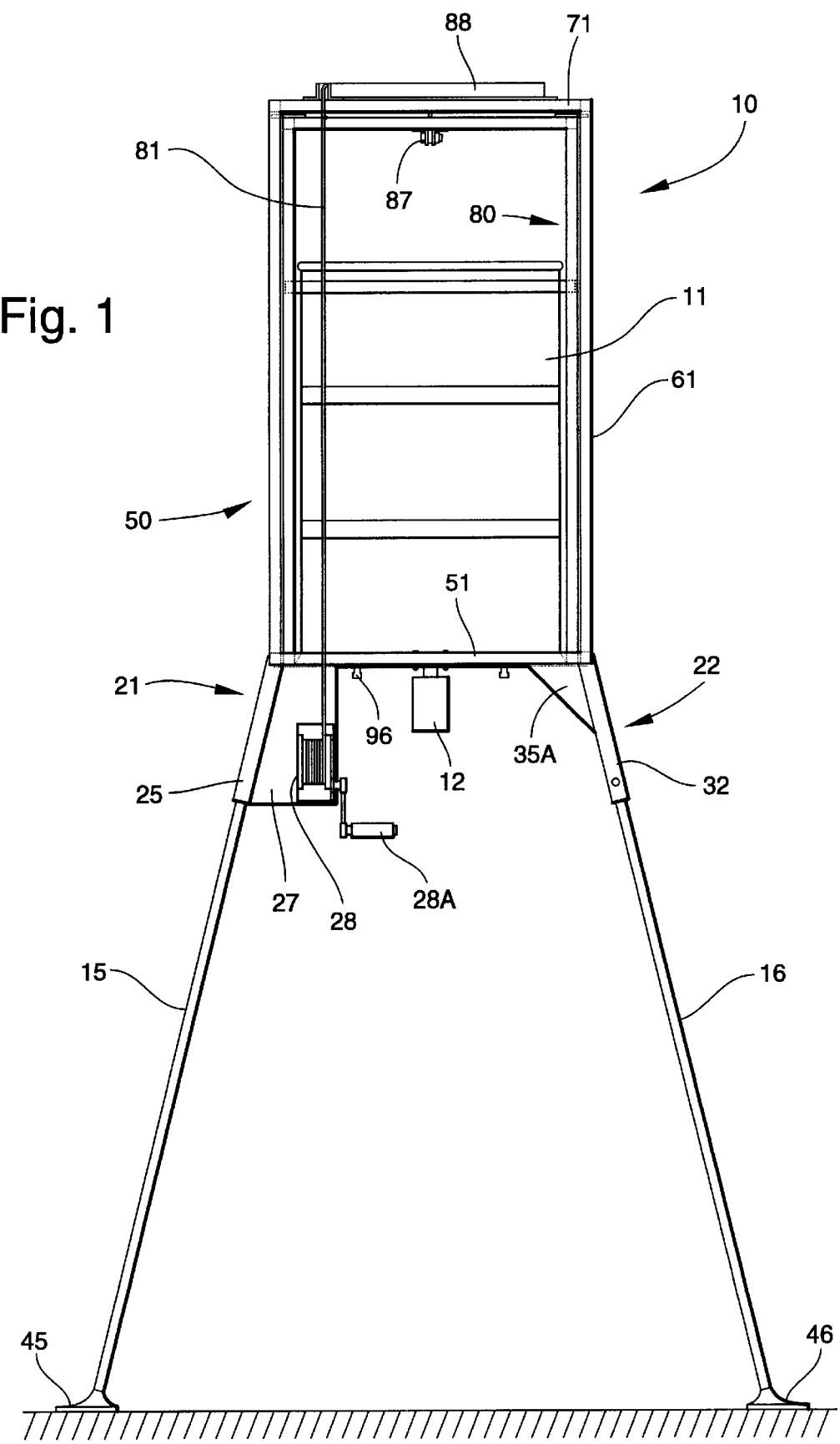
FIG. 1 is a side elevational view of an animal feed support stand according to one embodiment of the present invention.

Referring now specifically to the drawings, an animal feed support stand according to the present invention is illustrated in FIG. 1, and shown generally at reference numeral 10. The stand 10 carries a feed container 11, such as a 55-gal barrel containing up to 350 pounds of corn, grain, pellets, or the like. Preferably, the load capacity of the stand 10 is between 500 and 750 pounds. The feed is broadcast to the ground in an area surrounding the stand 10 by an automatic programmable game feeder 12, such as that manufactured by Cabela's of Oshkosh,. The feeder 12 communicates with an opening formed in the base of the container 11. Timely feedings promote viewing of deer, turkey, and other wildlife for landowners, photographers, and hunters.

Figure 2:
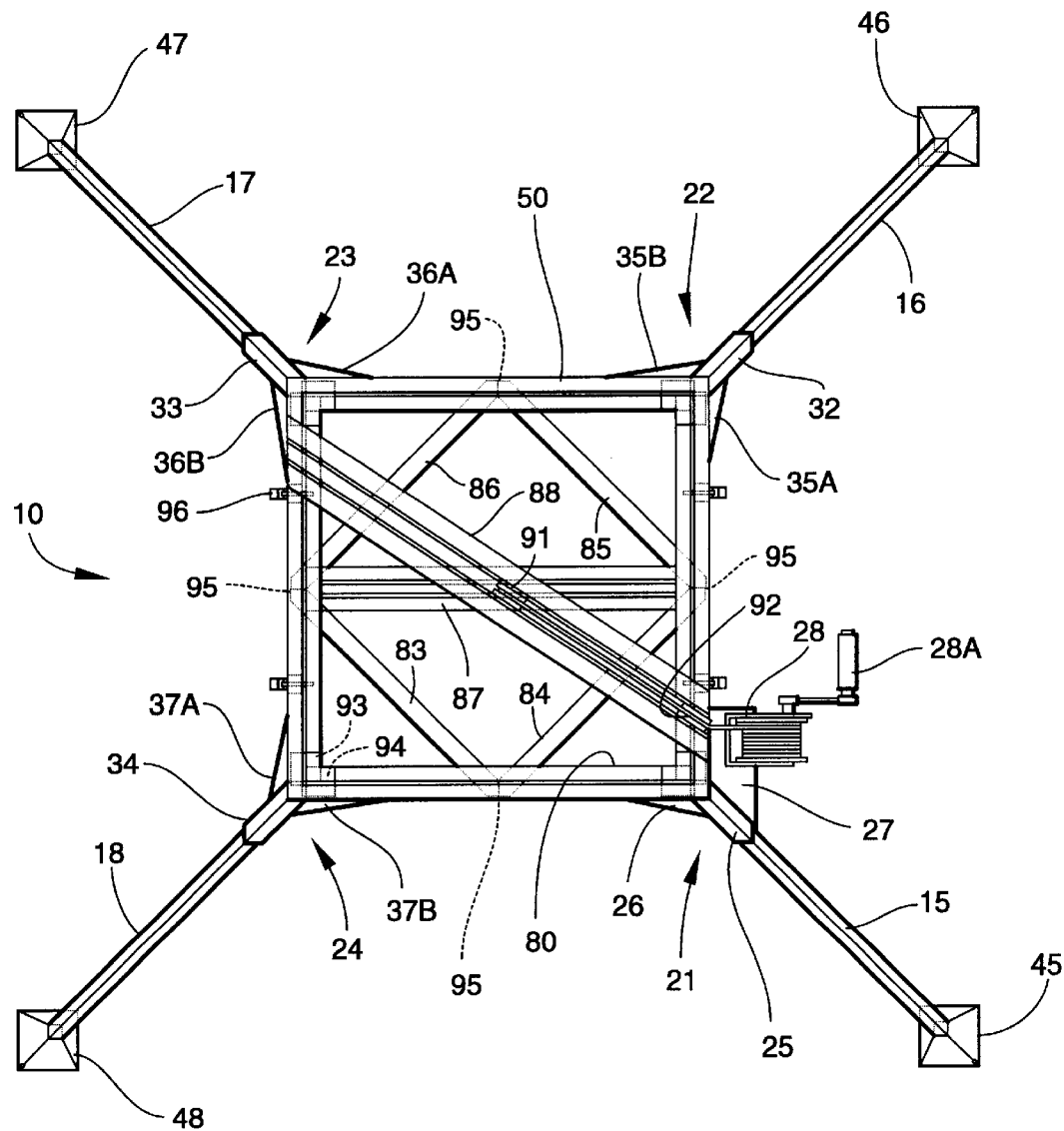
FIG. 2 is a top plan view of the animal feed support stand.
Figure 3:
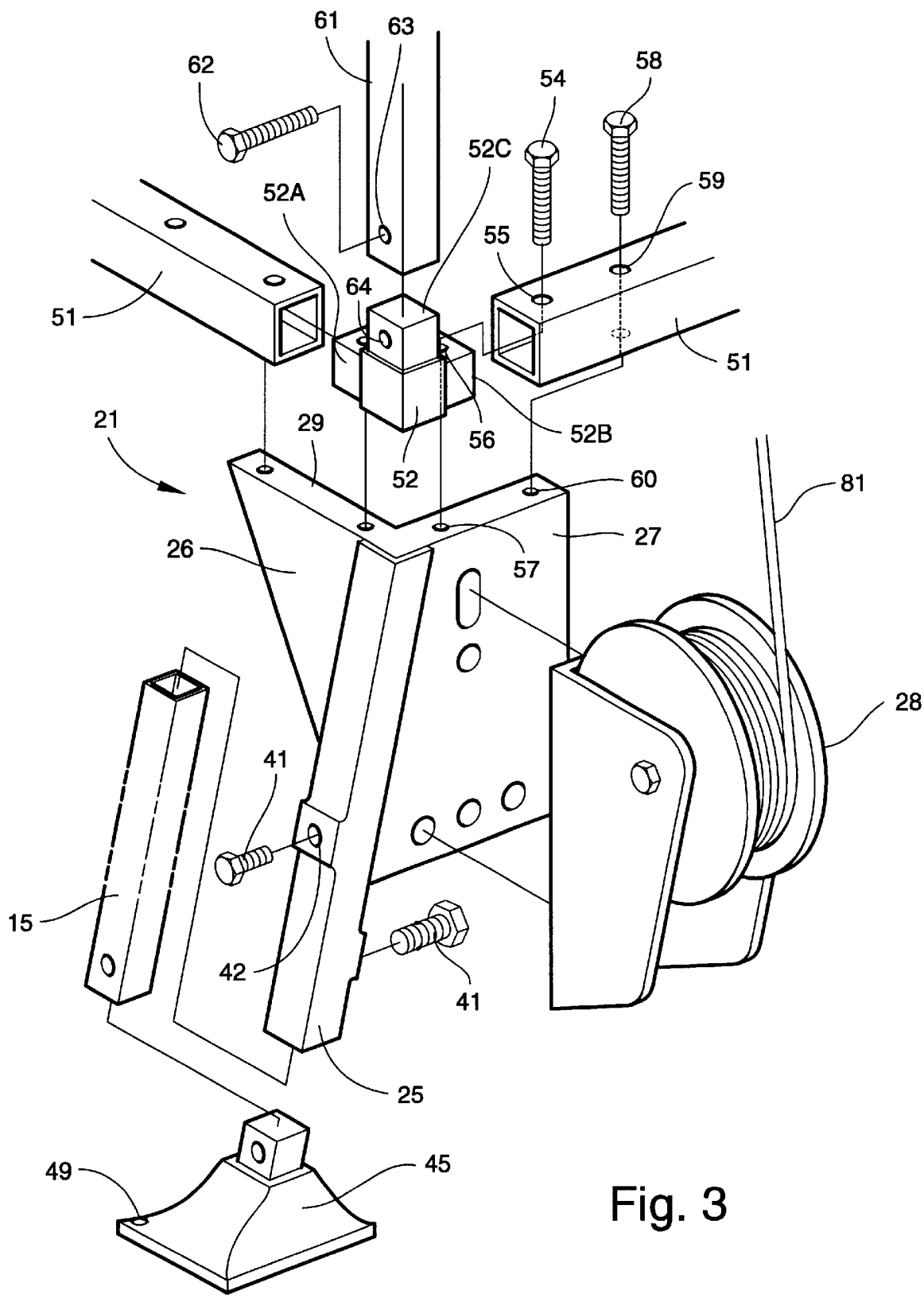
FIG. 3 is a fragmentary, exploded view of a portion of the animal feed support stand.

As shown in FIGS. 1–3, the stand 10 has a number of elongated support legs 15, 16, 17, and 18 which fit within respective integrally-formed, cast leg joints 21, 22, 23, and 24. The leg joint 21, best shown in FIG. 3, has a square tube sleeve 25, a side reinforcement web 26, a mounting plate 27 for carrying a cable winch 28, and a right angle base mounting surface 29. Each of the leg joints 22, 23, and 23 includes a square-tube sleeve 32, 33, and 34, opposing side reinforcement webs 35A&35B, 36A&36B, and 37A&37B, and a right angle mounting surface (not shown). The legs 15, 16, 17, and 18 slide within the square-tube sleeves 25, 32, 33, and 34, respectively, and are pressure set using spaced apart, opposing threaded pins 41 which are received within complementary threaded openings 42. The length of each leg 15–18 is independently adjustable in order to properly and securely mount the stand 10 on variable grade elevations. For added stability, the legs 15–18 have respective mounting feet 45, 46, 47, and 48 with small anchor holes 49 adapted for receiving anchor pins (not shown) to further secure the stand 10 to the ground.

The legs 15–18 are interconnected at the base of a protective housing 50 by four horizontal square-tube base segments 51 which attach to respective mounting surfaces (e.g., 29 of FIG. 3) of the leg joints 21–24. As shown in FIG. 3, respective ends of the base segments 51 are joined together at a base corner of the housing 50 by a connector 52 and threaded bolts 54 which pass through aligned openings 55, 56, and 57 in the base segments 51, connector 52, and leg joint 21. The ends of the base segments 51 mate with square nodes 52A, 52B of the connector 52. Additional bolts 58 pass through aligned openings 59 and 60 in the base segments 51 and leg joint 21 to further secure the protective housing 50 to the leg 15. A vertical square-tube segment 61 of the protective housing 50 mates with a third node 52C of the connector 52, and is secured by threaded bolt 62 passing through aligned openings 63 and 64. Each of the bolts 54, 58, and 62 is secured by a complementary-threaded nut (not shown). Like connectors 52 are located at the remaining seven corners of the protective housing 50, and cooperate with corresponding bolts and nuts to join together the base segments 51, vertical square-tube segments 61, and top horizontal square-tube segments 71 of the protective housing 50. The segments 51, 61, and 71 cooperate to form an open-sided and open ended end protective frame mounted on the legs 15–18 of the support stand 10 and adapted for surrounding and protecting the feed container 11.

Referring to FIGS. 2 and 4–8, the feed container 11 is supported on a movable carriage 80 suspended inside the protective housing 50 by a wire hoist cable 81 attached to the cable winch 28. The carriage 80 has a square frame which fits within the frame of the protective housing 50, diagonal base members 83, 84, 85, and 86 for supporting the feed container 11, and a top cross member 87 for attaching a free end of the hoist cable 81 to the carriage frame. As best shown in FIG. 2, the cable 81 extends from the top cross member 87 of the carriage 80 upwardly to a diagonal cross member 88 attached to the top of the protective housing 50. The diagonal cross member 88 carries pulleys 91 and 92 which serve to guide and control the pulling force of the hoist cable 81 upon operation of the cable winch 28. The winch 28 has a manual crank 28A for retracting and extending the hoist cable 81 to lift and lower the carriage 80.

FIG. 4 shows the carriage 80 in a lowered position such that the feed container 11 is located below the protective housing 50 and at a convenient height for filling. A pair of overlapping, square, carriage stop plates 93 and 94 (See FIG. 5) are fixed at each of the four top corners of the carriage 80, and project outwardly from the corner edges a distance sufficient to engage the base of the protective housing 50. The stop plates 93, 94 cooperate to limit downward movement of the carriage 80 in the fill position, and to maintain the feeder 12 a safe distance above the ground surface.

After filling the feed container 11, the winch 28 retracts the hoist cable 81 to move the carriage 80 upwardly into a raised, feed-dispensing position shown in FIG. 6. Upward movement of the carriage 80 is limited by points 95 formed by extended ends of the diagonal carriage base members 83, 84, 85, and 86, as best shown in FIGS. 2 and 7. When properly arranged within the protective housing 50, spring-loaded safety latches 96 operate to automatically lock the carriage 80 in the raised position such that the carriage 80 will not fall should the winch 28 be inadvertently released. In order to lower the carriage 80, the handle 97 of each safety latch 96 is pivoted downward to retract the catch 98 against the biasing force of the spring 99. The carriage 80 is then lowered at a controlled rate using the winch crank 28A.

An animal feed support stand is described above. Various details of the invention may be changed without departing from its scope. Furthermore, the foregoing description of the preferred embodiment of the invention and best mode for practicing the invention are provided for the purpose of illustration only and not for the purpose of limitation—the invention being defined by the claims.

I claim:

1. An animal feed support stand, comprising:
    (a) a plurality of elongated support legs;
    (b) a protective housing mounted on said legs, and defining an open bottom adapted for receiving an above-ground feed container for storing and dispensing animal feed;
    (c) a carriage for carrying the feed container;
    (d) means for moving said carriage vertically between a lowered fill position, whereby the feed container is located beneath said protective housing for filling, and a raised feed-dispensing position, whereby the feed container is located within said protective housing for dispensing feed to a ground surface below; and
    (e) a carriage stop located at a top of said carriage and adapted for engaging a bottom of said protective housing to limit downward movement of said carriage in the fill position.

2. An animal feed support stand according to claim 1, wherein said means for moving comprises a hoist cable connected to said carriage.

3. An animal feed support stand according to claim 2, wherein said means for moving further comprises a winch mounted adjacent to one of said plurality of support legs and connected to said hoist cable for mechanically retracting and extending said hoist cable to lift and lower said carriage.

4. An animal feed support stand according to claim 3, and comprising a cable pulley located on top of said protective housing to direct and control the pulling force of said hoist cable.

5. An animal feed support stand according to claim 4, and comprising a second cable pulley located on top of said protective housing to further direct and control the pulling force of said hoist cable.

6. An animal feed support stand according to claim 1, and comprising a safety latch located at a bottom of said protective housing and adapted for engaging said carriage to prevent sudden downward movement of said carriage from the raised feed-dispensing position.

7. An animal feed support stand according to claim 1, wherein each of said mounting feet located at respective free ends of said legs to said stand on the ground surface.

8. An animal feed support stand according to claim 1, wherein each of said mounting feet defines an anchor opening adapted for receiving an anchor pin therethrough to further stabilize said stand on the ground.

9. An animal feed support stand according to claim 1, wherein each of said support legs comprises an elongated hollow female section and an elongated male section, said male section adapted for being selectively received within said female section to adjust the length of said support leg.

10. An animal feed support stand according to claim 9, and comprising a set pin extending through the female section of said support leg and adapted for engaging the male section to set the length of said leg.

11. An animal feed support stand, comprising:

(a) a plurality of elongated support legs;

(b) a protective housing mounted on said legs, and defining an open bottom adapted for receiving an aboveground feed container for storing and dispensing animal feed;

(c) a carriage for carrying the feed container;

(d) means for moving said carriage vertically between a lowered fill position, whereby the feed container is located beneath said protective housing for filling, and a raised feed-dispensing position, whereby the feed container is located within said protective housing for dispensing feed to a ground surface below; and (e) a safety latch located at a bottom of said protective housing and adapted for engaging said carriage to prevent sudden downward movement of said carriage from the raised feed-dispensing position.

12. An animal feed support stand, comprising:

(a) a plurality of elongated support legs;

(b) a protective housing mounted on said legs, and defining an open bottom adapted for receiving an aboveground feed container for storing and dispensing animal feed;

(c) a carriage for carrying the feed container; and (d) means for moving said carriage vertically between a lowered fill position, whereby the feed container is located beneath said protective housing for filling, and a raised feed-dispensing position, whereby the feed container is located within said protective housing for dispensing feed to a ground surface below;

(e) a carriage stop located at a top of said carriage and adapted for engaging a bottom of said protective housing to limit downward movement of said carriage in the fill position; and (f) a safety latch located at a bottom of said protective housing and adapted for engaging said carriage to prevent sudden downward movement of said carriage from the raised feed-dispensing position.

13. An animal feed support stand according to claim 12, wherein said means for moving comprises a hoist cable connected to said carriage.

14. An animal feed support stand according to claim 13, wherein said means for moving further comprises a winch mounted adjacent to one of said plurality of support legs and connected to said hoist cable for mechanically retracting and extending said hoist cable to lift and lower said carriage.

15. An animal feed support stand according to claim 14, and comprising a cable pulley located on top of said protective housing to direct and control the pulling force of said hoist cable.

16. An animal feed support stand according to claim 15, and comprising a second cable pulley located on top of said protective housing to further direct and control the pulling force of said hoist cable.

17. An animal feed support stand according to claim 12, and comprising mounting feet located at respective free ends of said support legs to stabilize said stand on the ground surface.

18. An animal feed support stand according to claim 17, wherein each of said mounting feet defines as anchor opening adapted for receiving an anchor pin therethrough to further stabilize said stand on the ground surface.

19. An animal support stand according to claim 12, wherein each of said support legs comprises an elongated hollow female section and an elongated male section, said male section adapted for being selectively received within said female section to adjust the length of said support leg.

20. An animal feed support said according to claim 19, and comprising a set pin extending through the female section of said support leg and adapted for engaging the male section to set the length of said leg.

* * * * *